(12) United States Patent
Rao

(10) Patent No.: US 8,365,165 B2
(45) Date of Patent: Jan. 29, 2013

(54) DYNAMIC ADDITION OF PRODUCTS AND REMOVAL OF SOFTWARE PRODUCTS ON A DISTRIBUTION SERVER

(75) Inventor: Siddhartha Ashok Rao, Sandhausen (DE)

(73) Assignee: SAP AG, Walldorf (DE)

( * ) Notice: Subject to any disclaimer, the term of this patent is extended or adjusted under 35 U.S.C. 154(b) by 1343 days.

(21) Appl. No.: 11/618,794

(22) Filed: Dec. 30, 2006

(65) Prior Publication Data
US 2008/0163198 A1 Jul. 3, 2008

(51) Int. Cl.
*G06F 9/445* (2006.01)
(52) U.S. Cl. .................................................. 717/177
(58) Field of Classification Search ........................ None
See application file for complete search history.

(56) References Cited

U.S. PATENT DOCUMENTS

| | | | |
|---|---|---|---|
| 5,606,693 A | 2/1997 | Nilsen et al. | |
| 5,806,058 A * | 9/1998 | Mori et al. .......................... | 1/1 |
| 5,826,252 A | 10/1998 | Wolters, Jr. et al. | |
| 5,924,094 A | 7/1999 | Sutter | |
| 6,003,097 A | 12/1999 | Richman et al. | |
| 6,151,708 A | 11/2000 | Pedrizetti et al. | |
| 6,418,554 B1 | 7/2002 | Delo et al. | |
| 6,425,078 B1 | 7/2002 | Smith et al. | |
| 6,484,149 B1 | 11/2002 | Jammes et al. | |
| 6,647,394 B1 | 11/2003 | Herzberg et al. | |
| 6,687,698 B1 | 2/2004 | Nixon et al. | |
| 6,704,737 B1 | 3/2004 | Nixon et al. | |
| 6,714,928 B1 | 3/2004 | Calow | |
| 6,744,450 B1 | 6/2004 | Zimniewicz et al. | |
| 6,779,179 B1 | 8/2004 | Romm et al. | |
| 6,789,255 B1 * | 9/2004 | Pedrizetti et al. .............. | 717/169 |
| 6,802,061 B1 | 10/2004 | Parthasarathy et al. | |
| 6,804,663 B1 | 10/2004 | Delo | |
| 6,947,959 B1 | 9/2005 | Gill | |
| 7,054,931 B1 | 5/2006 | Candan et al. | |
| 7,181,739 B1 * | 2/2007 | Harral et al. .................. | 717/176 |
| 7,203,738 B1 | 4/2007 | McGill et al. | |
| 7,219,332 B2 | 5/2007 | Gouge et al. | |
| 7,552,431 B2 | 6/2009 | Napier et al. | |
| 7,657,885 B2 | 2/2010 | Anderson | |
| 7,823,146 B2 | 10/2010 | Surace | |
| 7,917,602 B2 | 3/2011 | Sweatt, III et al. | |
| 2001/0056362 A1 | 12/2001 | Hanagan et al. | |
| 2002/0104069 A1 | 8/2002 | Gouge et al. | |
| 2002/0188941 A1 | 12/2002 | Cicciarelli et al. | |
| 2003/0023874 A1 * | 1/2003 | Prokupets et al. ............ | 713/201 |

(Continued)

OTHER PUBLICATIONS

Perry, Christian, "Install & Uninstall Software," Jan. 2003, http://www.smartcomputing..com, Smart Computing Article, vol. 9, Issue 1, 9 pages.

(Continued)

*Primary Examiner* — Wei Zhen
*Assistant Examiner* — Adam R. Banes
(74) *Attorney, Agent, or Firm* — Kenyon & Kenyon LLP

(57) ABSTRACT

A system and method for adding and/or removing a software product to a distribution server is provided. Upon identification that a software product desired is not indexed in the installation server database of the distribution server, then adding the software product to the distribution server. The distribution server maintains multiple products, every product components of the multiple products is indexed by the installation server database of the distribution server. Removal of a software product requires removal of the software product from the index maintained by the installation server database of the distribution server.

20 Claims, 11 Drawing Sheets

U.S. PATENT DOCUMENTS

| | | |
|---|---|---|
| 2003/0105752 A1* | 6/2003 | Kabasakalian et al. ............ 707/4 |
| 2003/0220883 A1 | 11/2003 | Block et al. |
| 2003/0233634 A1* | 12/2003 | Carrez et al. .................. 717/124 |
| 2004/0003389 A1* | 1/2004 | Reynar et al. ................. 717/178 |
| 2004/0024921 A1* | 2/2004 | Peake et al. ........................ 710/1 |
| 2004/0123284 A1 | 6/2004 | Bryant et al. |
| 2004/0133487 A1 | 7/2004 | Hanagan et al. |
| 2004/0143830 A1 | 7/2004 | Gupton et al. |
| 2004/0169686 A1 | 9/2004 | Zimniewicz et al. |
| 2004/0243997 A1 | 12/2004 | Mullen et al. |
| 2005/0049906 A1 | 3/2005 | Leymann et al. |
| 2005/0055692 A1 | 3/2005 | Lupini et al. |
| 2005/0066324 A1 | 3/2005 | Delgado et al. |
| 2005/0080796 A1 | 4/2005 | Midgley |
| 2005/0086632 A1* | 4/2005 | Oyama .......................... 717/100 |
| 2005/0149873 A1 | 7/2005 | Guido et al. |
| 2005/0216890 A1 | 9/2005 | Sundararajan et al. |
| 2005/0216906 A1* | 9/2005 | Shahindoust et al. ......... 717/171 |
| 2005/0262502 A1 | 11/2005 | Lari et al. |
| 2005/0278341 A1* | 12/2005 | Kostadinov et al. ............ 707/10 |
| 2006/0041879 A1 | 2/2006 | Bower et al. |
| 2006/0048130 A1 | 3/2006 | Napier et al. |
| 2006/0048140 A1 | 3/2006 | Boctor et al. |
| 2006/0123414 A1 | 6/2006 | Fors et al. |
| 2006/0136906 A1 | 6/2006 | Hughes et al. |
| 2006/0155672 A1 | 7/2006 | Lee et al. |
| 2006/0184932 A1 | 8/2006 | Burnley et al. |
| 2006/0195839 A1 | 8/2006 | Lin et al. |
| 2006/0200814 A1 | 9/2006 | Kontinen et al. |
| 2006/0277542 A1 | 12/2006 | Wipfel |
| 2007/0033588 A1* | 2/2007 | Landsman ..................... 717/178 |
| 2007/0106984 A1* | 5/2007 | Birk Olsen et al. ........... 717/174 |
| 2007/0168940 A1 | 7/2007 | Lunawat |
| 2007/0169113 A1 | 7/2007 | Moore et al. |
| 2007/0220505 A1 | 9/2007 | Bukovec et al. |
| 2007/0234346 A1 | 10/2007 | Kramer et al. |
| 2007/0256072 A1 | 11/2007 | Barr et al. |
| 2007/0283345 A1 | 12/2007 | Fujishita |
| 2007/0288548 A1* | 12/2007 | Creamer et al. .............. 709/202 |
| 2008/0091942 A1 | 4/2008 | Glatfelter et al. |
| 2008/0120614 A1 | 5/2008 | Yamada |
| 2008/0127175 A1 | 5/2008 | Naranjo et al. |
| 2009/0150881 A1 | 6/2009 | Lupini et al. |
| 2010/0293048 A1 | 11/2010 | Singolda et al. |

OTHER PUBLICATIONS

Sun Microsystems, "Sun Update Manager 1.0 Administration Guide," 2005, Sun Microsystems, Inc., Chapter 4, 10 pages.

Wikipedia, "Installation (Computer Programs)," retrieved May 7, 2010, http://en.wikipedia.org, 3 pages.

\* cited by examiner

DYNAMIC ADDITION OF PRODUCTS AND REMOVAL OF SOFTWARE PRODUCTS ON A DISTRIBUTION SERVER

BACKGROUND

A business system may include a variety of software applications that can be installed on a distribution server for later distribution to user computers to allow users to perform operations within the business system. Each software application generally includes an installation application, which when run on a computer configures the software application on the computer. Since a business system may include a large number of software applications, many such installations may be required to properly configure a computer before it can be used in the business system. When a previously installed software application is to be replaced by an updated version of the application, the previous version often must be removed from the computer prior to installation of the new version. Software applications may rely on other applications, requiring the applications to be installed in a particular order or priority.

DETAILED DESCRIPTION

Embodiments of the present invention provide an administrator or other entity having access rights to effect the dynamic addition of multiple products to a distribution server. Embodiments of the present invention may also provide an administrator or other entity rights to effect the dynamic removal of multiple products from a distribution server. An administrator or other entity may request and obtain preconfigured installation packages containing the new products for essentially simultaneous installation.

Figure 1:
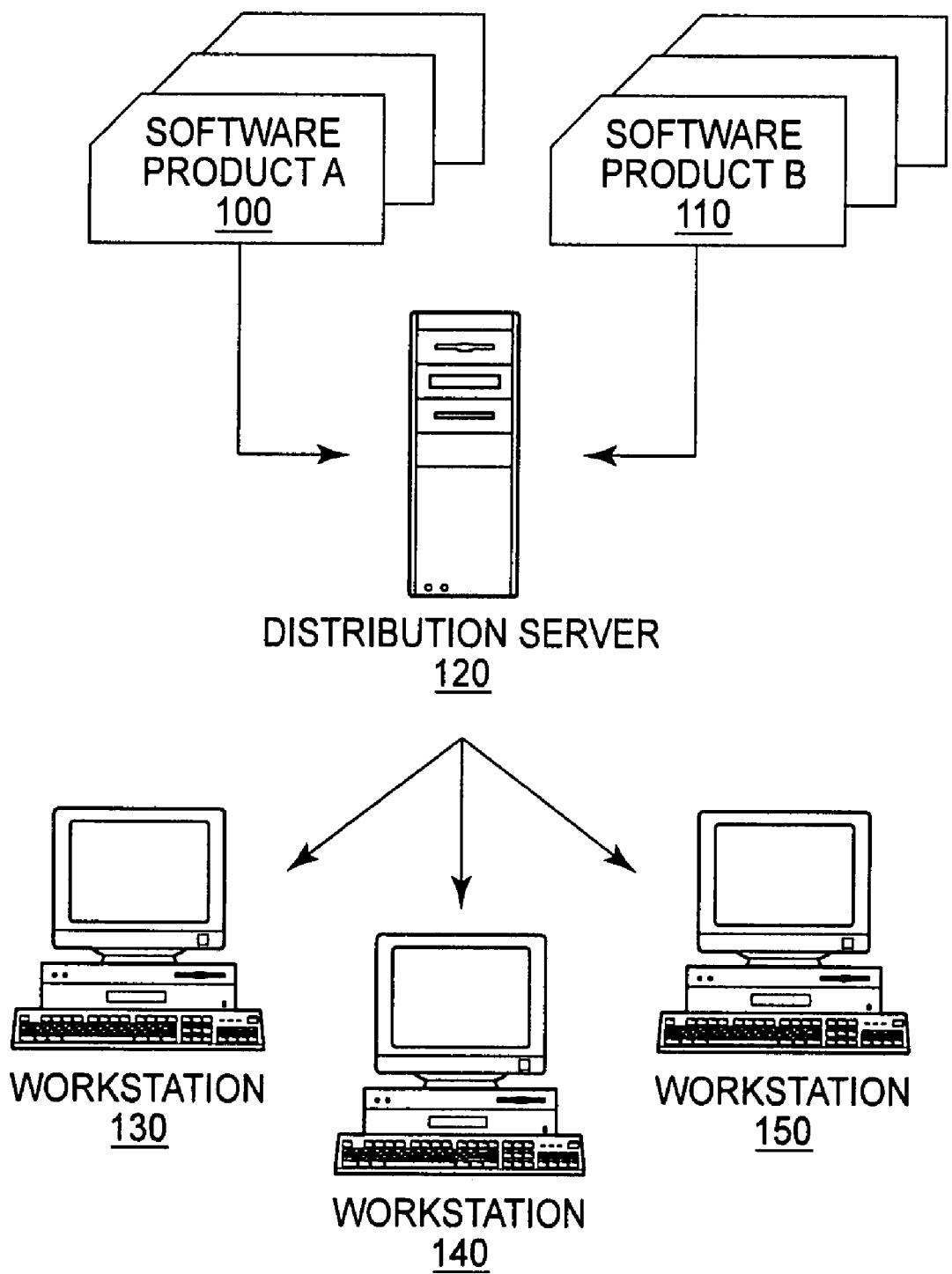
FIG. 1 shows an example system according to the present invention.

In embodiments of the present invention, an installation server or distribution server 120 may be used not only as a distribution point for distributing software 100, 110, e.g., a front end software, as shown in FIG. 1, to one or more workstations 130, 140, 150 or other end entities, but also as the recipient of software products and parts thereof.

In embodiments of the present invention, an administrator or other entity may use the same installation software for past present and/or future products. Throughout this specification, the administrator or other entity which may include an automated function/machine, a person, and authorized person, etc.—will be referred to as "the administrator." This term is not meant to limit the type of entity who can effect such actions. Embodiments of the present invention allow for the administrator to add new products or parts thereof to an existing server and remove undesired products or parts thereof. Throughout this specification, the term product will be used to indicate a software product or application, and/or part thereof. Throughout this specification, the term server may refer to a computing device, a computer readable medium/media, and/or a network-accessed site. In further embodiments, the new product(s) to be added may be administrator-configurable, and may be made available for installation on user workstations or other computing devices.

In embodiments of the present invention, a database is split on hierarchical, location, and/or content. A database split on a hierarchical level provides for an installation server database which is the default database loaded by an installation server, and at least one product database. The at least one product database, or component(s), is associated with the software product. In embodiments of the present invention, when a product is added to a distribution server, an installation server database associated with that product is loaded by default. That installation server database then may enlist other product databases to be loaded by the distribution server. The loading of a product database by the server involves copying the product components to the distribution server and registering the new product database with the installation server database on the distribution server. The installation server database indexes the subsequently added products/components.

In embodiments of the present invention, a product is comprised of one or more components. A component or installation component, may include file(s), registry key(s), script, etc. An action can install a component. A UI layer, for example, may be a collection of actions. Installation of a component effects an installation of everything included in that product component, which may include multiple files and registry keys. Likewise, uninstallation of a component effects an uninstallation of everything included in the product component. In an embodiment, when a request is made to delete a product, a check is done to see if an installation component of the product is used by another product, and if not, the product may be deleted. An administrator may or may not request to remove a component of a product, but rather the product in its entirety.

Figure 2:
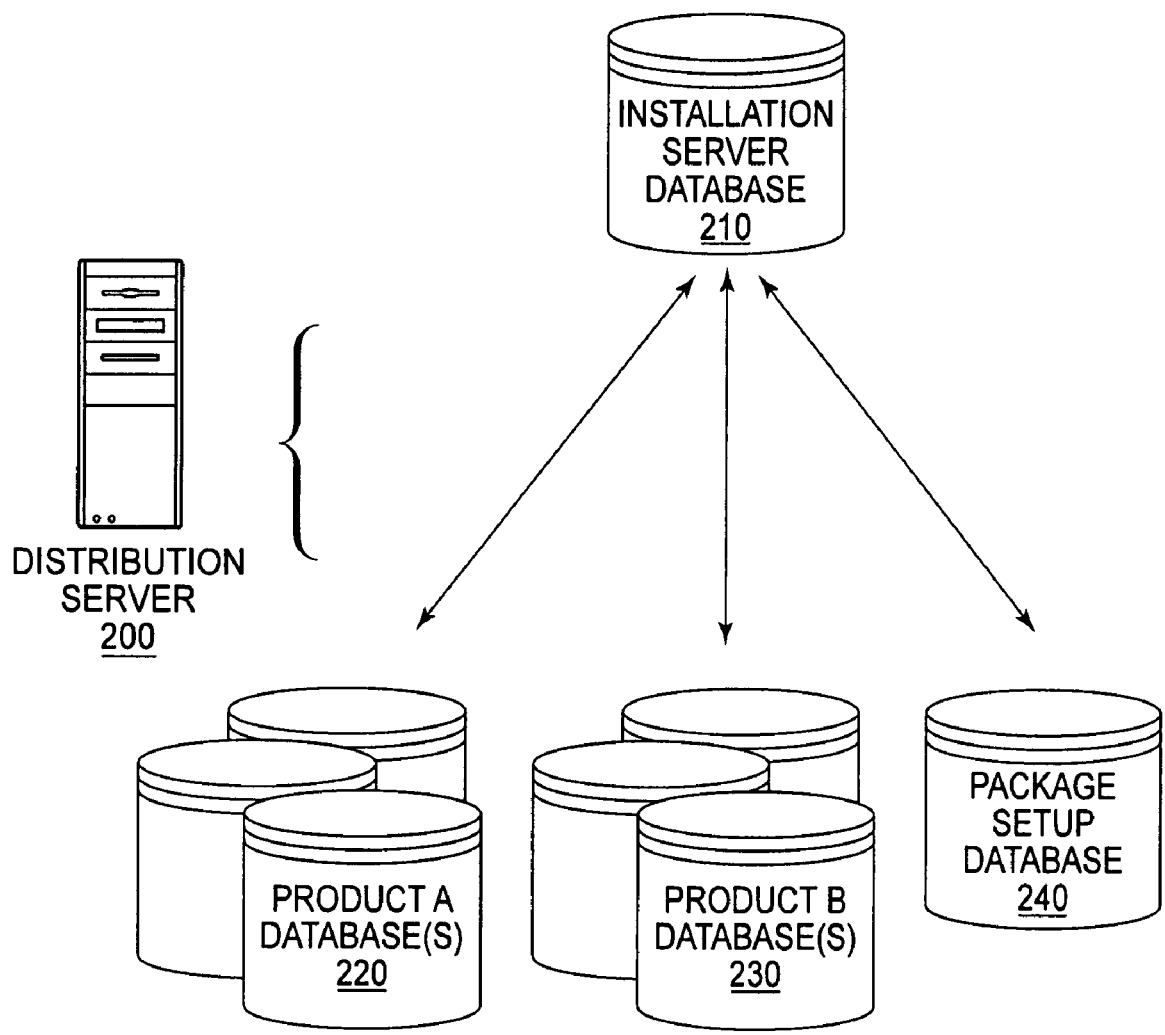
FIG. 2 shows a database system of a distribution server according to an embodiment of the present invention.

FIG. 2 shows an exemplary database system of a distribution server 200. The distribution server contains an installation server database 210 which indexes each of the product A database(s) 220, product B database(s) 230, and, possibly, a package setup database 240 (for configuring packages to user workstations and the like).

Figure 3:
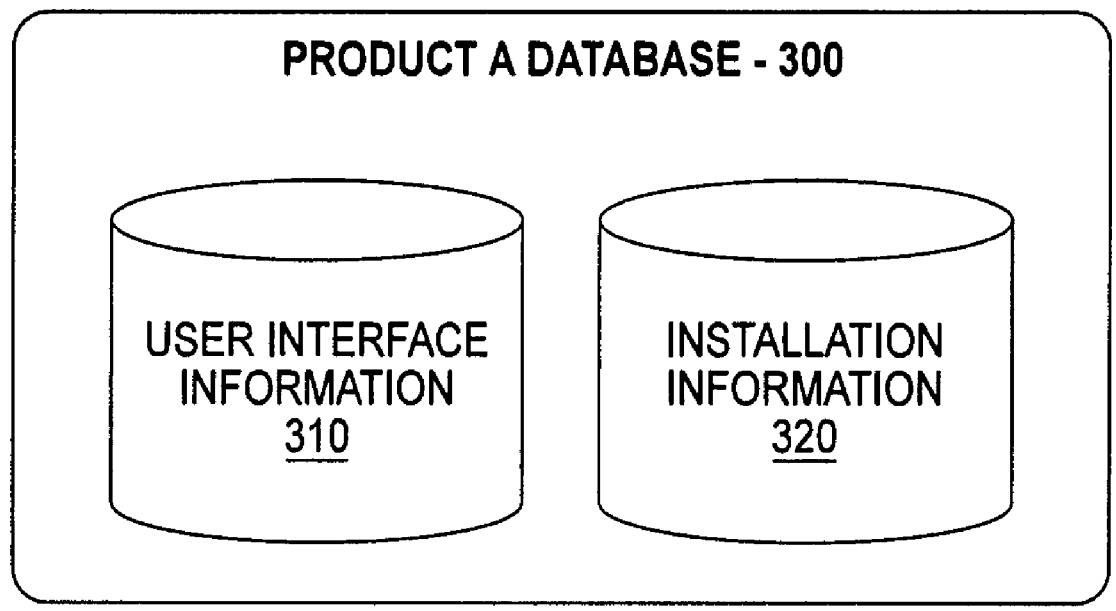
FIG. 3 shows a product database according to an embodiment of the present invention.

FIG. 3 shows an exemplary database of a product A database 300. The product A database 300 is split on user interface information 310 and installation information 320. This architecture may allow for ease and flexibility in managing the product databases in the distribution server.

In embodiments of the present invention, an administrator can receive a new product via, for example, the Internet, a company Intranet, local area network (LAN), wide-access area network (WAN) a hardwired connection, a computer readable medium such as a DVD, CDROM, disk, and/or flash memory. The administrator may then start the installer's server management tool. The administrator is then able to select "add" or similar function, and add the desired new product to the administrators intended server destination. The server destination may have several products existing on it at the time. The effect of adding the new product to the server involves a copying by the installers server management tool of the product file(s) and product database(s) associated with the product. Further, the installer's server management tool registers the product database(s) with the installation server database on the server destination.

In embodiments of the present invention, the administrator or other entity may wish to remove a product or part thereof from the server or from the choices available for installation. To remove a product or part thereof, i.e., a component, from the choices available for installation, the administrator must remove the indexing of the product files/databases with on the installation server database. Upon removal, it is as if the product does not exist on the server even though it is essentially present. A user and the administrator will not see this product in the user interface generated by the server displaying the contents of the installation server database. Further, an administrator may remove the product components/databases from the server as well.

In embodiments of the present invention, a product may be shipped with a database. The database may contain pre-configured package installation data for the product. The database is registered by the server's installation server database.

In the distribution server, there is a database, e.g., the installation server database, which is made hierarchically superior. The installation server database indexes and reads the other databases. When a new product is shipped to the administrator e.g., via a computer the act of adding products involves getting the database from the new product location onto the server and indexed by the hierarchically first database.

In further embodiments, a notepad text file may keep information concerning the products to be installed.

In embodiments of the present invention, products and parts thereof are being added to the distribution server.

Installation is a database oriented activity. The changes to the state of an installed product is reflected in an installation database. In embodiments of the present invention, the server may provide for an abstraction of data management from the user interface and installation tools. The Data Manager of the distribution server may isolate the database syntax from the installation feature(s) implementations.

In embodiments of the present invention, the installation process may be synchronized by a visual basic script. It is appreciated here that other available programming languages may be used. Visual Basic is used here for illustrative purposes. The setup start application loads a script host that parses and executes the visual basic script. The script then uses the engine objects and tools to perform various installation activities.

In embodiments of the present invention, multiple products may be handled by a distribution server. Further, sharing of products and/or their components may be effected across products. Further, user interface data is isolated from the installation data. Further, the database having a split architecture may be in an easier to read and understand format, possibly allowing more users to configure product installations.

In embodiments of the present invention, the server design may provide that the script has superior control over the user interface on a page by page basis. Further, the script may validate user input and react to the same immediately rather than wait for a wizard object to complete execution. Further, defining server internal and external installation actions allow for scaling of the engine functionality for future usage.

In embodiments of the present invention, one may administer multiple products on a single distribution server. Further, products may be added or removed from the distribution server by an administrator or other authorized entity. Packages may be configured across products.

In embodiments of the present invention, there is an installation server database and a workstation database per product. When loaded, the default engine database is loaded first. Further, inter-dependency between products is recognized and may be indicated in the distribution server indexing installation server database. Some example engine classes include SetupEngine (instantiated by script), DataManager, DataExchange, SetupUIManager. The DataManager, DataExchange and SetupUIManager are instantiated by the server.

In embodiments of the present invention, the distribution database may also contain an uninstallation tool to remove software from the distribution database and/or other computers. The uninstallation tool involves reading and interpretation of the installation databases, providing options for partial uninstallment of components unnecessary for other component(s). Further, an administrator of the distribution server may delete products from the server or empty the server. Authorization may be provided to another as well. Further, an automatic deletion of products and/or their components may be instituted on the distribution server.

In embodiments of the present invention, the processes create server and add product are a part of the deployment tools. Thus, once an installation server is created, the add product process may extend the functional scope of the server to one that can handle and distribute multiple products over a network.

In embodiments of the present invention, every product in an installation server has its respective installation information stored in its own product database(s) which is a part of the installation server database. The installation server database contains a collection of individual product databases, and also information pertaining to configured product packages in the installation server. The deployment tools may use the installation server database to perform server administration, et al.

In embodiments of the present invention, the installation server database may be comprised of smaller product databases. Interaction between the installation server database and the products available on the server is via, e.g., the server engine.

In embodiments of the present invention, information contained in the installation server database is user interface information and product installation information. User interface information is, for example, information pertaining to the display of a product available for installation. User interface information may also be, for example, information pertaining to product component selection/auto selection/auto deselection in the user interface. Product installation information is, for example, information regarding the product file(s) including paths, versions, etc. Further, product installation information also includes, for example, registration information for the product, data for the installer to configure product installations, etc. In embodiments of the present invention, the isolation of these two types of information provides for easy readability and changeability.

In embodiments of the present invention, a database is classified by type on the basis of the default installation server, or engine, database loaded by the server, and is categorized on the basis of its location. For example, an installation server database is a default database loaded by an installation software engine, and contains installation software relevant information and assists the server in identifying and locating product database(s). For example, a product database contains product installation information. It is appreciated that the databases may be maintained in various formats. For example, the database may be used in xml format which allows for a certain ease of readability, ease of data retrieval and insertion (with parsers readily available), and ease of distribution (due to compactness).

In embodiments of the present invention, an engine, or server, loads a respective installation server database on the basis of the context in which it has been started (e.g., distribution server or workstation). The content of the database tags inform the engine, or server, of the product(s) available by presenting the location of their respective product database(s). A server, or engine, may identify the contents of a database tag as belonging to a specific product, thus, the tag provides for a structural organization of installation data.

In embodiments of the present invention, the distribution server presents information to a user (i.e., administrator) via a user interface, and performs deployment, patch, or uninstallation activities. The user interface features allow for product listing, subcomponent of product listing, auto-selection of downward components (i.e., selection of parent provides for automatic selection of child), dependency selection, and package creation/information.

In embodiments of the present invention, for example, the implementation of user interface hierarchy may be achieved through nested <Contains> xml-tags. The higher-level tag becomes the parent of the tags below it. And, component installation order is affected by Requires> xml-tags which provide that required components are installed before the components or products that require them. The user interface tree may be constructed using <contains> xml-tags.

Figure 4:
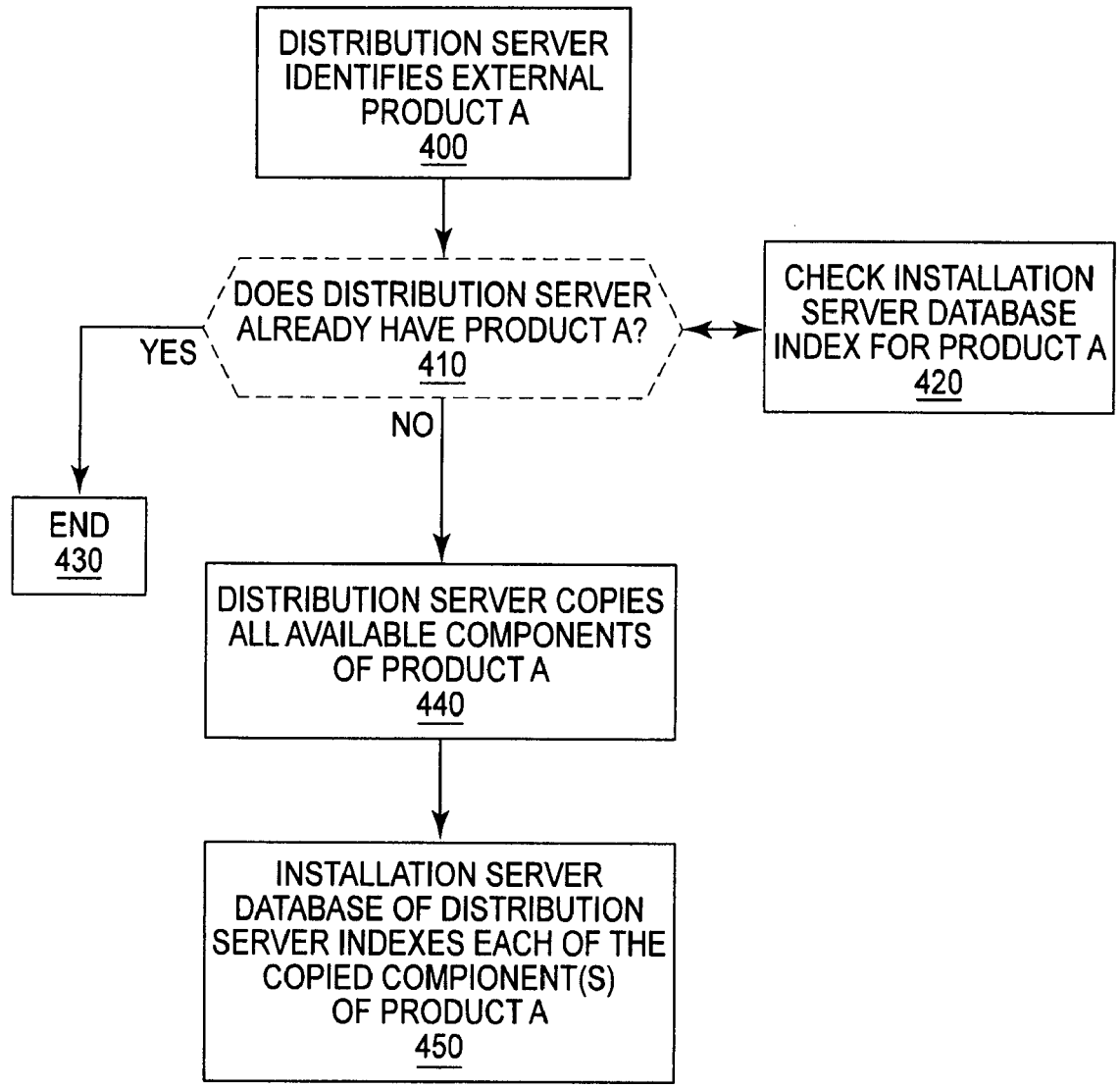
FIG. 4 shows a flowchart of adding files to a distribution server according to an embodiment of the present invention.

FIG. 4 shows a flowchart involving adding one or more products to a distribution server from other locations. The other locations may include networked resources, a portable medium, another server, etc. The distribution server identifies an external product A which it may wish to load 400. The distribution server may then proceed with checking whether it already contains product A or part thereof or if there are any conflicts involved in adding product A 410. The installation server database which indexes all of the product databases is checked for product A 420, instead of checking each individual product databases. If the distribution server already has product A, then the installation server database does not act further with respect to obtaining the product A 430. In this situation, an alert may be sent to the administrator, or a notation concerning the attempt may be logged in a table. If the distribution server does not already have product A 410, then the distribution server may copy all available components of product A from the source/location 440. The installation server database of the distribution server indexes each of the copied components/databases of product A 450. This indexing may be automatically triggered when a product files are being installed on the distribution server.

Figure 5:
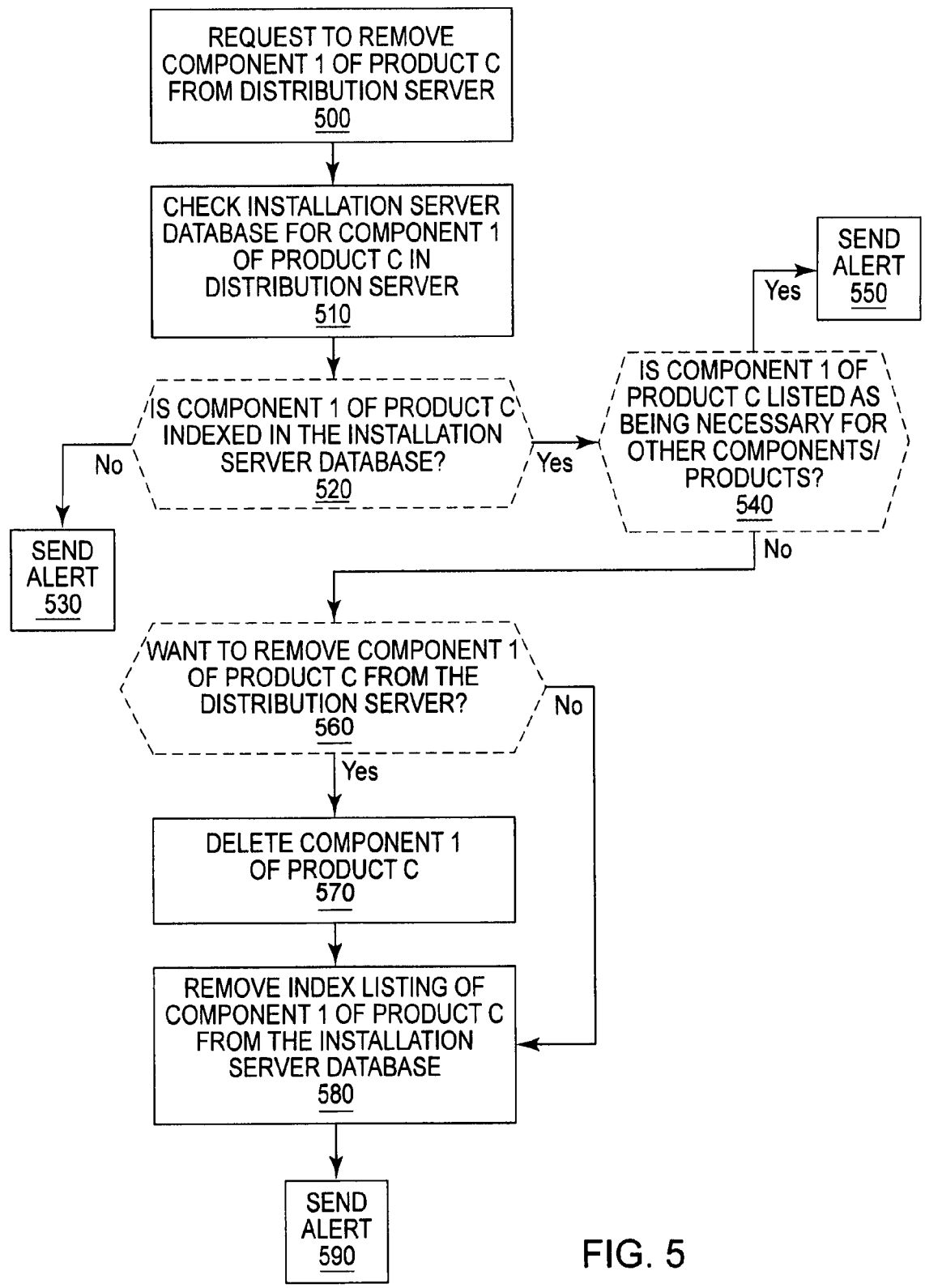
FIG. 5 shows a flowchart of removing files from a distribution server according to an embodiment of the present invention.

FIG. 5 shows a flowchart involving removing one or more products from a distribution server. A request to remove a product from the distribution server 500 may trigger a check of the installation server database of the distribution server for that product 510. If the product is not indexed in the installation server database 520, then an alert may be sent to the administrator or a notice logged which indicates that the product is not indexed on the distribution server. If the product is indexed, then a check is done whether the product or component thereof, is necessary for other product(s) to function as desired 540. If the product is necessary, then an alert may be sent to the administrator 550, or a notice is logged to indicate that the product will not be removed without, e.g., additional confirmation, in view of the dependence of another product. If the product is not necessary for other product(s) on the distribution server, then the administrator may be queried whether he would like to remove the product completely from the distribution server 560. If yes, then the product is deleted from the distribution server 570, and removed from the indexed listing on the installation server database 580. If the administrator does not wish to also remove the product from the distribution server, then the product is deleted from the indexed listing on the installation server database 580. Additionally, an alert or communication may be sent to the administrator or to a log file to indicate the removal of the product.

Figure 6:
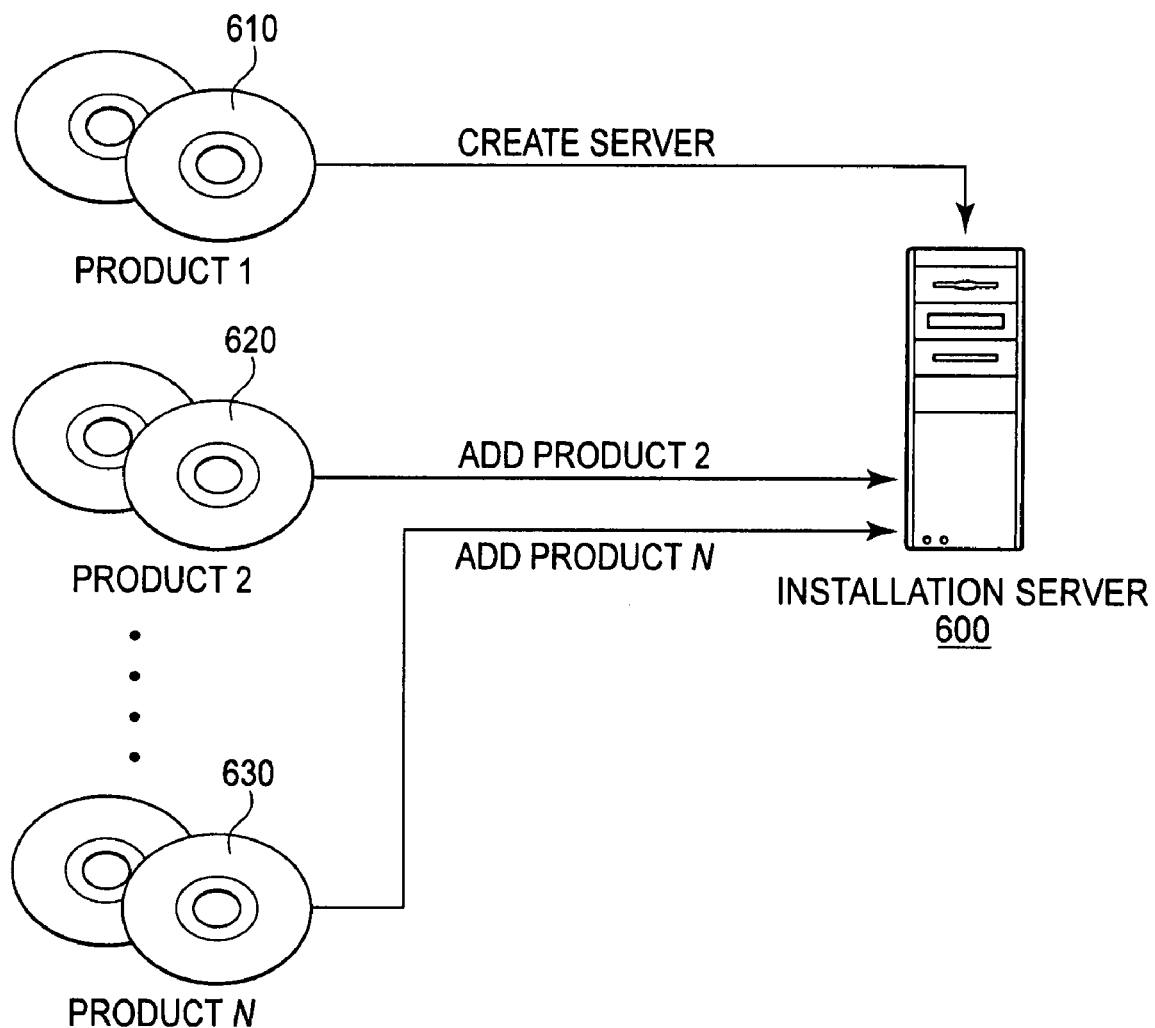
FIG. 6 shows a system according to an embodiment of the present invention.

FIG. 6 shows another system embodiment of the present invention. Multiple software products 610, 620, . . . 630, may be added to a distribution server 600 essentially simultaneously. The first product 610 added to the distribution server creates the installation server database which indexes itself and all of the subsequently loaded products 620, 630. A server creation tool may be used to create the installation server database.

Figure 7:
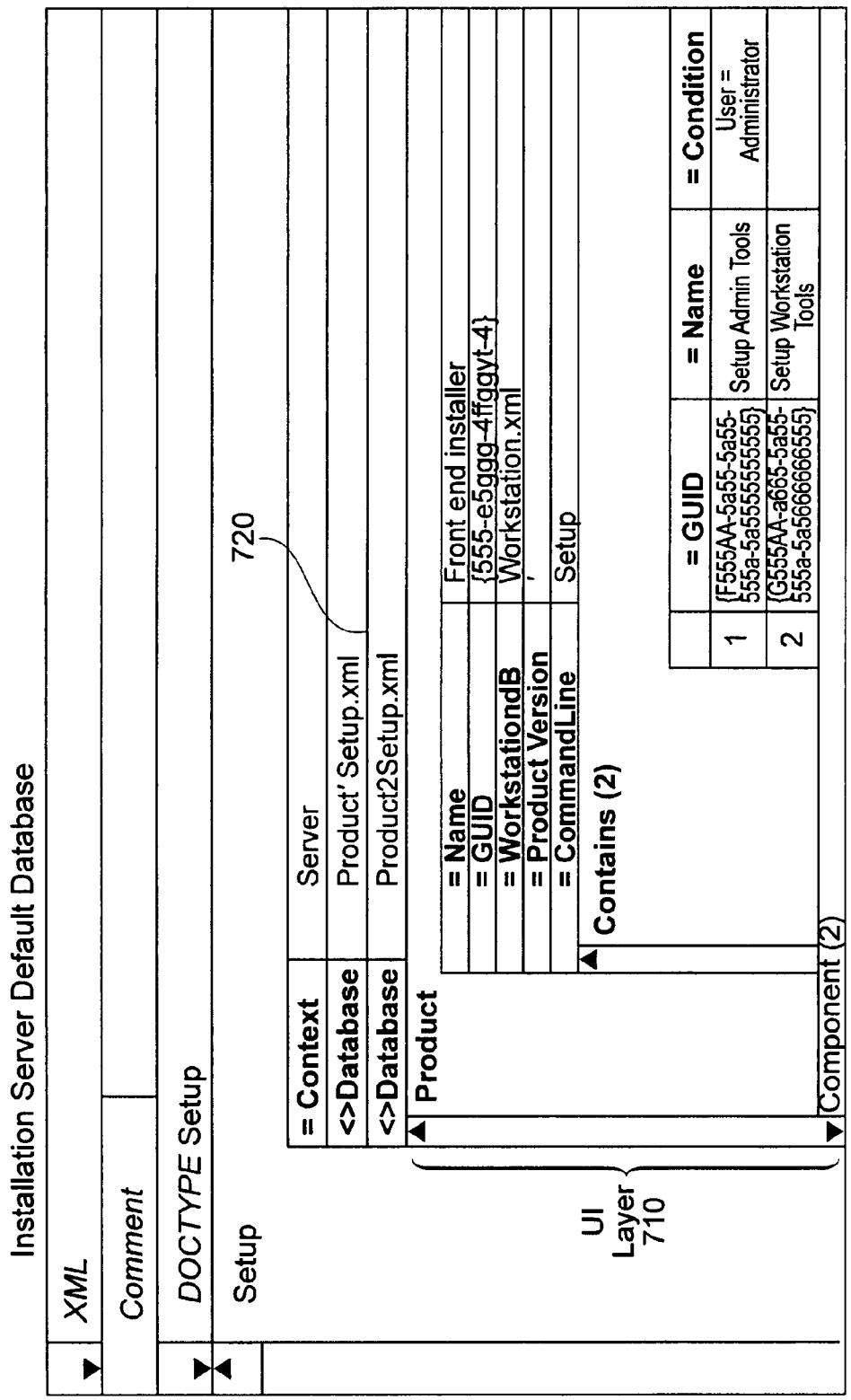
FIG. 7 shows a user interface of an installation server database according to an embodiment of the present invention.

FIG. 7 shows an example user interface which indexes the products, the product GUID (globally unique identifier), etc. Here, the data manager keeps track of the databases to be loaded 720.

Figure 8:
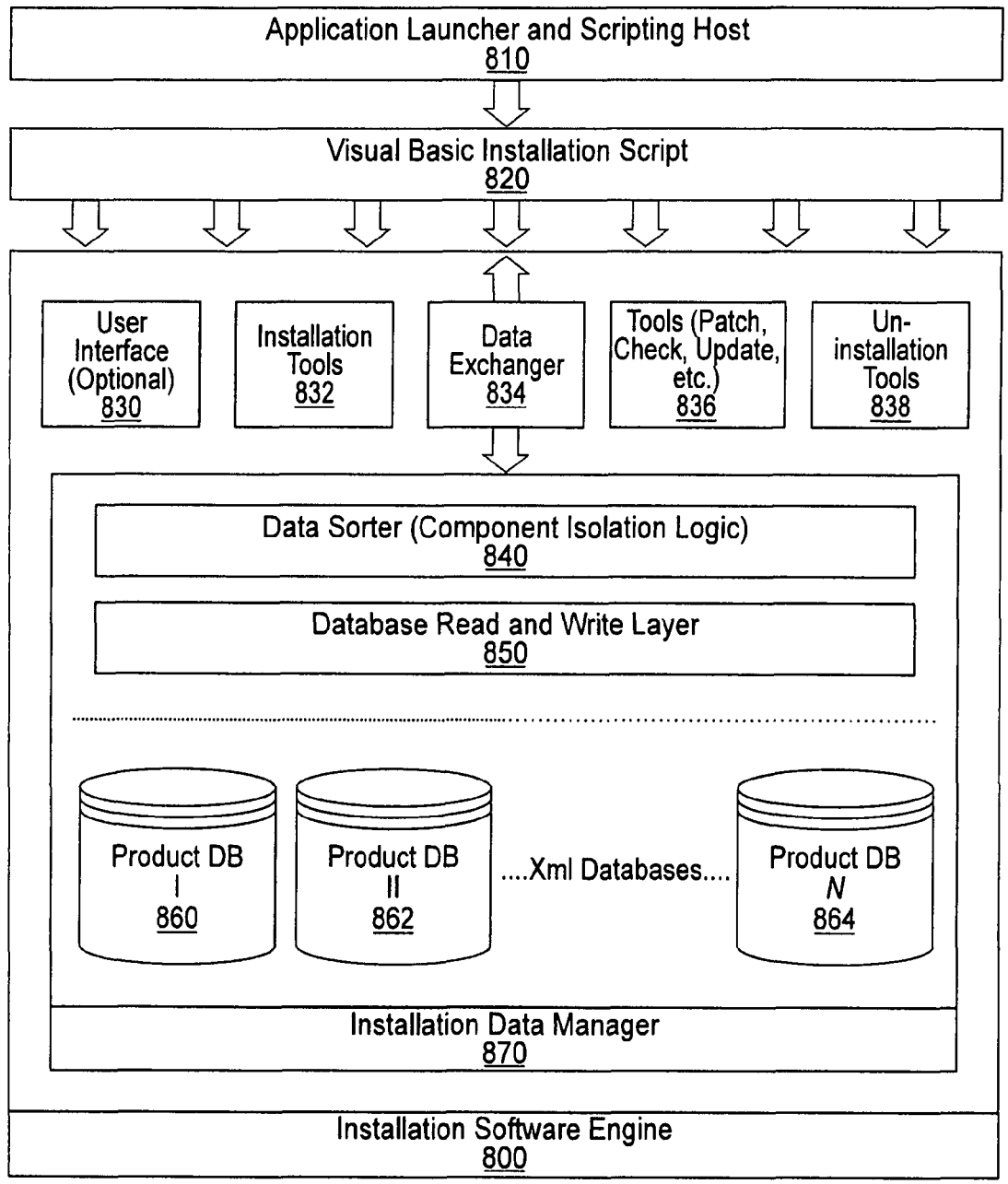
FIG. 8 shows an example installation software server according to an embodiment of the present invention.
Figure 9:
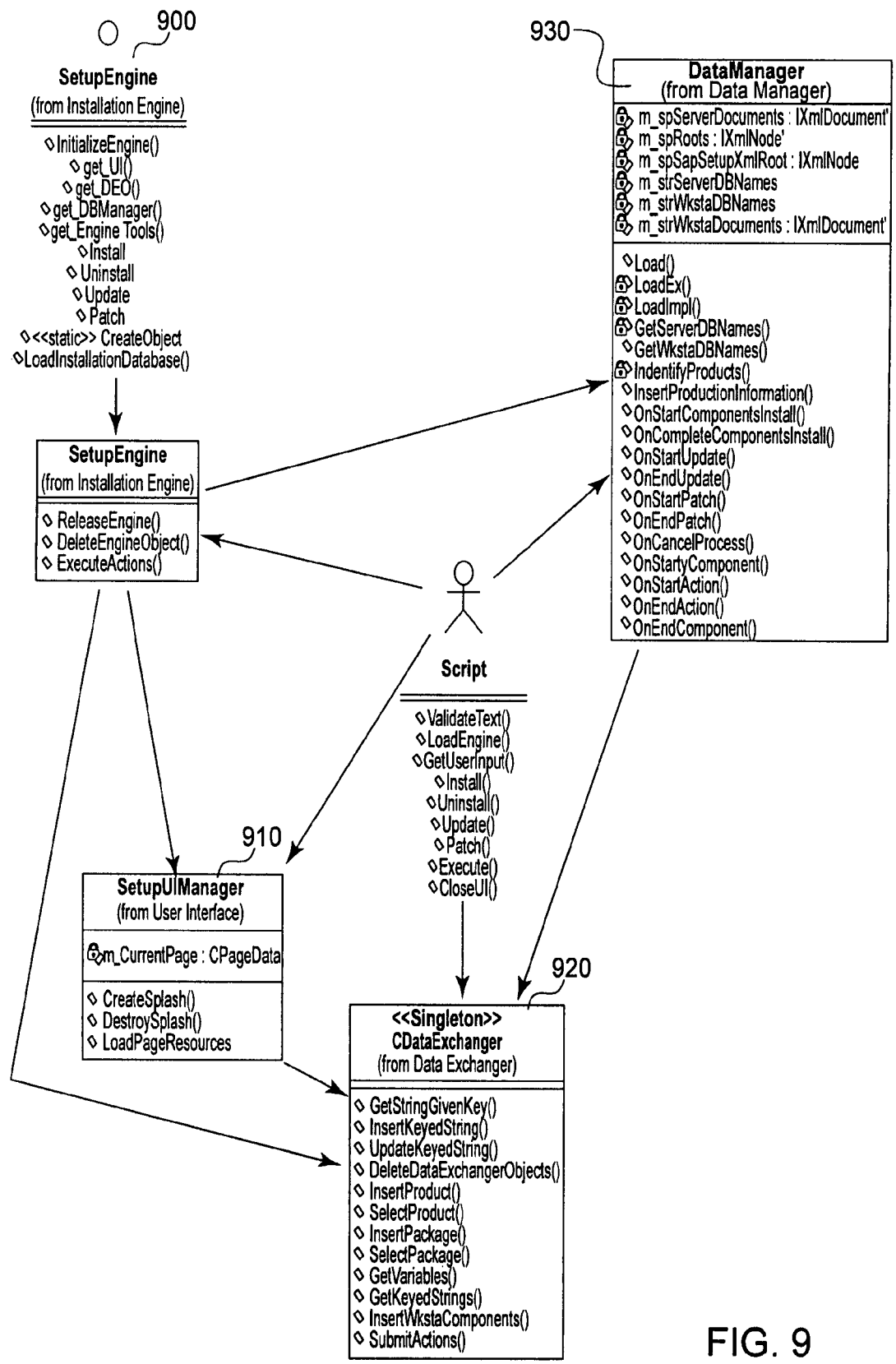
FIG. 9 shows example functions of a system according to an embodiment of the present invention.

FIG. 8 shows an installation server database or engine 800 according to an embodiment of the present invention. The installation server database 800 contains an installation data manager 870 which manages the product databases 860, 862, 864. The installation data manager 870 also includes a data sorter 840 and a database read and write layer 850 in order to manage the resident databases. The installation server database 800 may also contain various tools including a user interface tool 830, installation tools 832, a data exchanger 834, additional tools (such as patch tools, check tools, update tools) 836, and uninstallation tools 838. Acting upon an installation server database 800 may be an external application launcher and scripting host 810 using a visual basic installation script 820. FIG. 9 shows exemplary functions and commands which may be employed in embodiments of the present invention. These functions and commands are those used by the setup engine of the installation server database or engine 900, the setup user interface manager (of the user interface) 910, the data exchanger 920, and the data manager 930.

Figure 10:
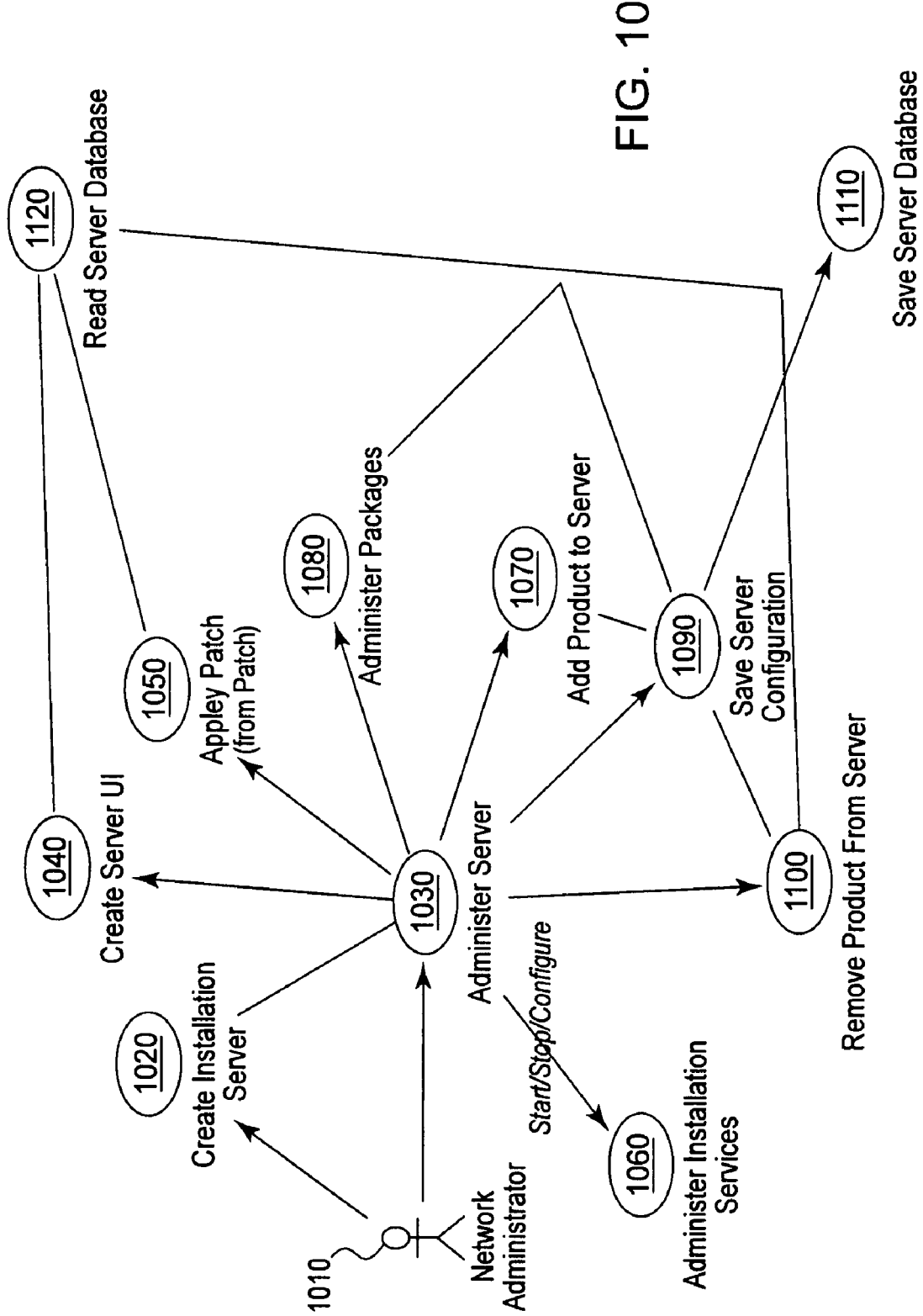
FIG. 10 shows a flow diagram of a system according to an embodiment of the present invention.

FIG. 10 shows a flow diagram of the relationships between a network administrator 1010 and the various tools the network administrator may allow. For example, the network administrator may allow for creation of the distribution server 1020 and of the user interface server 1040. Other tools include an administer server 1030, an apply patch tool 1050, administer installation services 1060, add product tool 1070, an administer packages tool 1080, save server configuration tool 1090, remove product 1100, save server database tool 1110, and read server database 1120.

Figure 11:
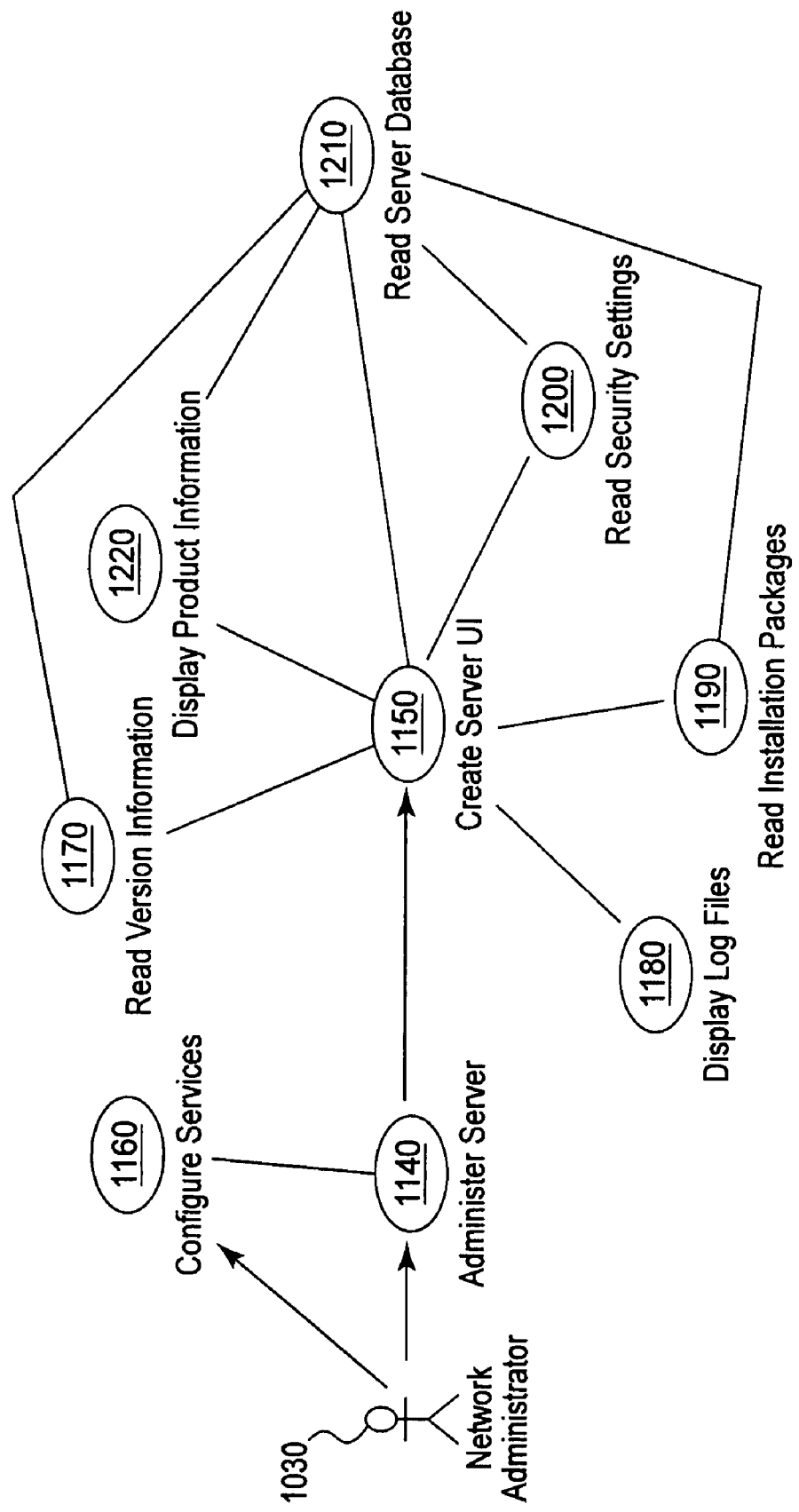
FIG. 11 shows a flow diagram of a system according to an embodiment of the present invention.

FIG. 11 shows a flow diagram of relationships between the create server user interface tool 1150 and other tools. For example, a network administrator 1130 uses the administer server 1140 to manage matters. The administer or distribution server may include configurable services 1160 and may activate the create server user interface 1150. The create server user interface tool 1150 may involve a reading of version information 1170, a display of log files 1180, a reading of installation packages 1190, a reading of security settings 1200, a reading of the installation server database 1210 and a display of product information 1220.

Software applications, or programs, may be stored in a business system. The software applications may be stored, for example, in a distribution server in communication with other servers and workstations in the business system. The applications may be stored and accessed using various storage devices and computer systems available. An administrator may access the software applications in the business system.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A method of adding a software product to a distribution server, comprising:
    identifying an external software product;
    loading an installation server database at the distribution server;
    determining whether the distribution server contains the external software product by checking index records of all added product databases of existing software products on the distribution server in the installation server database, wherein the distribution server has a hierarchical split architecture and the installation server database is hierarchically superior to all other databases on the distribution server;
    if the distribution server does not contain the external software product, then adding the external software product to the distribution server;
    isolating user interface tools from installation tools of the external software product;
    indexing components of the external software product including the user interface tools and installation tools in the installation server database, wherein the installation server database provides access to the distribution server for external users;
    receiving an administrator request to perform an action on a specified component of the external software product;
    checking relationships of the specified component with other components of the external software product and/or other software products stored in the distribution server to determine permissibility of the action;
    if the action is permissible, querying the administrator whether to perform the action in the distribution server;
    if a confirmation is received, performing the action in the distribution server and changing the specified component's index listing in the installation server to reflect the action's performance; and
    if the confirmation is not received, changing the specified component's index listing to reflect the action's performance without performing the action in the distribution server.

2. The method of claim 1, wherein the adding the software product to the distribution server is adding a link to the software product located elsewhere.

3. The method of claim 1, wherein the adding the software product to the distribution server is a copying of components associated with the software product.

4. The method of claim 1, further comprising if the distribution server does contain the software product, then sending an alert to an administrator of the distribution server.

5. The method of claim 1, further comprising sending an alert to an administrator of the distribution server when the software product has been added.

6. The method of claim 1, wherein the distribution server maintains multiple software products, each of the multiple software products being indexed in the installation server database of the distribution server.

7. The method of claim 1, wherein the indexing is automatically triggered when the components are being added to the distribution server.

8. The method of claim 1, wherein a software product is a component of the software product.

9. The method of claim 1, wherein the software product is located on at least one of a different server, an internet site, a media, a CDROM, a DVD, a flash memory, and an email attachment.

10. The method of claim 1, further comprising: associating a user access security so that only an authorized user may add a software product, wherein the user access security is stored in the installation server database.

11. A method of removing a component of a software product from a distribution server, comprising:
    identifying the component of the software product to be removed;
    loading an installation server database at the distribution server;
    determining whether the distribution server contains the component of the software product by checking index records of all added product databases of existing software products on the distribution server in the installation server database, wherein the distribution server has a hierarchical split architecture and the installation server database is hierarchically superior to all other databases on the distribution server, wherein the installation server database provides access to the distribution server for external users;
    if the distribution server does contain the component of the software product, then checking relationships of the component with other components of the software product and/or components of other software products to determine permissibility of the removal,
    if the removal is permissible, receiving a selection of removal type;
    based on the removal type, or removing its index listing from the installation server while keeping the component of the software product in the distribution server.

12. The method of claim 11, further comprising if the distribution server does not contain the software product, then an alert is communicated to an administrator of the distribution server.

13. The method of claim 11, further comprising removing the software product from the distribution server.

14. The method of claim 11, wherein the distribution server maintains multiple software products, each of the multiple software products being indexed in the installation server database of the distribution server.

15. The method of claim 14, wherein multiple products may be removed from the distribution server.

16. The method of claim 11, wherein a software product is a component of the software product.

17. The method of claim 11, further comprising: associating a user access security so that only an authorized user may remove a software product, wherein the user access security is stored in the installation server database.

18. A non-transitory computer-readable medium storing instructions for execution by a processor, which when executed by the processor perform:
    identifying an external software product; loading an installation server database at the distribution server;

determining whether the distribution server contains the external software product by checking index records of all added product databases of existing software products on the distribution server in the installation server database, wherein the distribution server has a hierarchical split architecture and the installation server database is hierarchically superior to all other databases on the distribution server;

if the distribution server does not contain the external software product, then adding the software product to the distribution server;

isolating user interface tools from installation tools of the external software product;

indexing components of the external software product including the user interface tools and installation tools in the installation server database, wherein the installation server database provides access to the distribution server for external users;

receiving an administrator request to perform an action on a specified component of the external software product;

checking relationships of the specified component with other components of the external software product and/or other software products stored in the distribution server to determine permissibility of the action;

if the action is permissible, querying the administrator whether to perform the action in the distribution server;

if a confirmation is received, performing the action in the distribution server and changing the specified component's index listing in the installation server to reflect the action's performance; and if the confirmation is not received, changing the specified component's index listing to reflect the action's performance without performing the action in the distribution server.

19. The method of claim 1, wherein the action is removing the specified component.

20. The computer-readable medium of claim 18, wherein the action is removing the specified component.

* * * * *